United States Patent
Overhultz et al.

(10) Patent No.: US 7,233,241 B2
(45) Date of Patent: Jun. 19, 2007

(54) LOW STOCK ALERT SYSTEM

(75) Inventors: Gary L. Overhultz, River Forest, IL (US); Gordon E. Hardman, Boulder, CO (US); John W. Pyne, Erie, CO (US)

(73) Assignee: Goliath Solutions, LLC, Chicago, IL (US)

( * ) Notice: Subject to any disclaimer, the term of this patent is extended or adjusted under 35 U.S.C. 154(b) by 0 days.

(21) Appl. No.: 11/281,283

(22) Filed: Nov. 17, 2005

(65) Prior Publication Data

US 2006/0164247 A1 Jul. 27, 2006

Related U.S. Application Data

(60) Provisional application No. 60/629,496, filed on Nov. 19, 2004.

(51) Int. Cl.
*G08B 1/00* (2006.01)

(52) U.S. Cl. .............. 340/539.2; 340/539.11; 340/825.36; 700/213; 700/231; 211/59.2

(58) Field of Classification Search ......... 340/539.2, 340/539.11, 545.3, 825.36; 700/213, 231; 211/59.2, 49.1; 235/385
See application file for complete search history.

(56) References Cited

U.S. PATENT DOCUMENTS

| | | | |
|---|---|---|---|
| 4,389,157 A * | 6/1983 | Bernard et al. ............ 414/787 |
| 4,483,459 A * | 11/1984 | Taylor et al. ............... 221/14 |
| 4,992,940 A | 2/1991 | Dworkin | |
| 5,407,050 A * | 4/1995 | Takemoto et al. .......... 194/205 |
| 5,493,107 A | 2/1996 | Gupta et al. | |
| 5,730,320 A * | 3/1998 | David .......................... 221/279 |
| 5,771,005 A | 6/1998 | Goodwin | |
| 5,793,029 A | 8/1998 | Goodwin | |
| 6,253,190 B1 | 6/2001 | Sutherland | |
| 6,264,104 B1 | 7/2001 | Jenkins et al. | |
| 6,543,688 B1 * | 4/2003 | Massaro ....................... 235/383 |
| 6,601,764 B1 | 8/2003 | Goodwin | |
| 6,610,379 B1 | 8/2003 | Adams et al. | |
| 6,669,089 B2 | 12/2003 | Cybulski et al. | |
| 6,669,092 B2 * | 12/2003 | Leanheart et al. ...... 235/462.13 |
| 6,693,539 B2 | 2/2004 | Bowers et al. | |
| 6,693,541 B2 | 2/2004 | Egbert | |
| 6,696,920 B1 | 2/2004 | Goodwin et al. | |
| 6,715,675 B1 | 4/2004 | Rosenfeld | |
| 6,736,316 B2 | 5/2004 | Neumark | |
| 6,747,560 B2 | 6/2004 | Stevens | |
| 6,749,116 B2 * | 6/2004 | Massaro ....................... 235/383 |
| 6,768,419 B2 | 7/2004 | Garber et al. | |
| 6,796,508 B2 | 9/2004 | Muller | |
| 6,824,065 B2 | 11/2004 | Boone et al. | |
| 6,827,256 B2 * | 12/2004 | Stobbe ......................... 235/375 |

(Continued)

*Primary Examiner*—Benjamin C. Lee
*Assistant Examiner*—Daniel Previl
(74) *Attorney, Agent, or Firm*—Jones Day

(57) ABSTRACT

A low product stock display system for detecting at least one of fully stocked, partially stocked, and empty (no stock) shelf has been described. The presence/absence of stock can be detected by conductive contact sensors, inductance sensors, weight sensors, optical sensors, and, in the preferred embodiment, with an RF transmission line. The data from a sensor is wirelessly relayed to an external server for processing across a plurality of facilities, and can provide alerts to personnel or systems responsible for reordering or restocking the particular shelf or display at the facility.

14 Claims, 5 Drawing Sheets

U.S. PATENT DOCUMENTS

| | | |
|---|---|---|
| 6,840,440 B2 | 1/2005 | Uozumi et al. |
| 6,843,415 B2 | 1/2005 | Vogler |
| 6,844,821 B2 | 1/2005 | Swartzed et al. |
| 6,848,616 B2 | 2/2005 | Tsirline et al. |
| 6,951,305 B2 | 10/2005 | Overhultz et al. |
| 2003/0004784 A1* | 1/2003 | Li et al. .................. 705/10 |
| 2005/0056091 A1 | 3/2005 | Overhultz et al. |
| 2005/0258955 A1 | 11/2005 | Gloekler et al. |
| 2005/0258966 A1 | 11/2005 | Wuan |

* cited by examiner

LOW STOCK ALERT SYSTEM

CROSS REFERENCE TO RELATED APPLICATION

This application claims the benefit of U.S. Provisional Application Ser. No. 60/629,496, filed on Nov. 19, 2004, which is assigned to the assignee of the present application. The applicants are claiming priority to this provisional application, making the effective filing date of this application Nov. 19, 2004.

FIELD OF THE INVENTION

The present invention relates in general to stocked product detection systems, and in particular, to a system for monitoring the presence and location of product displays and the presence, absence, or partial availability of the stocked product.

BACKGROUND OF THE INVENTION

Due to the seasonal and impulse-purchase nature of many products, sale facilities can go from fully stocked to out-of-stock on key promotional items very quickly. In many such cases, additional stock can be pulled from proximal storage areas to rapidly remedy situations if alerts can be generated to indicate that stocked product volume is waning or fully depleted. In other cases, early notification of partial or full out-of-stock conditions significantly decreases the period where sales are lost due to lack of merchandise. In the case of temporary or permanent displays, low- or no-stock conditions can result in the display being pulled from the selling area, and in many cases, destroyed or discarded.

Many Consumer Packaged Goods (CPG) items have such erratic sales patterns. For example, an entire section of soda or bottled water can be depleted from supermarket shelves in a few hours. Often there is no safety stock in the back room, and it can take a significant amount of time for store personnel to notice that the shelf is depleted and place a replenishment order. Substantial sales increases often occur when product is displayed, featured, or given a significant price reduction for a certain period. Out-of-stock conditions result in missed sales and frustrated customers.

Trade publications forecast widespread use of RFID tags on consumer products to complement the UPC (i.e. ePC) in a 5–15 year timeframe. However, such system is subject to the future development of a very inexpensive tag, cheaper and more effective readers, and full deployment of shelf-based antenna systems in retail outlets. Thus, sophisticated, inexpensive systems predicated on such use of the ePC (passive RFID tags applied to individual product items) are years away from being implemented.

Further, temporary displays are often discarded after only a few days or weeks, which means that stock-status detection equipment would need to be either disposable or very portable and easily redeployed by non-technical in-store personnel. When implemented, such systems may not cover certain types of product or packaging due to their challenging RF properties.

In applicant's commonly assigned and published application S.N. US 2004/0056091, incorporated herein in its entirety, there is disclosed RF tags of various types (e.g. passive, semi-passive, active, and the like), Backscatter Reader Transmitters (BRT), and hubs. Typically, each BRT is a fully self-contained, battery operated unit, and utilizes three antennas. Two medium gain patch antennas are used to read the tags, and a whip antenna is used to report the received data over a wireless link to the hub. Active transmitter tags can have contacts or other sensors that allow them to function like "readers" by collecting data proximal to them and reporting directly to the hub.

It would be advantageous to modify such system for detecting and monitoring presence/absence of stocked product in a simple, economical manner. What is desired, therefore, is a simple, inexpensive device that can detect and report on-shelf product status as being out-of-stock, fully stocked, or some state in between, regardless of where the items are displayed in the store or facility.

SUMMARY OF THE INVENTION

The present invention greatly reduces the costs of prior art systems for monitoring the presence/absence of stocked products and/or product displays in a product sales facility. The prior art relied on human observation or customer complaints to indicate low- or no-stock conditions.

The term "display", as used herein, is intended to cover shelves or product containers of all types, permanent or temporary displays, advertising or merchandising material containing products, products with other products associated with them, dump bins, racks, pegboards, counter-tops, dispensers, or other materials intended to hold consumer products in a retail facility, desired to be monitored for presence/absence by retailers or manufacturers.

The novel invention discloses a system for providing low stock alert signals to a store or facility manager, as well as manufacturer personnel who may assist in reordering or restocking. It also allows a "scorecard" to be created that shows total days or hours a given low-or out-of-stock condition existed. A sensor is associated with each display device for sensing the presence or absence of stocked product and generates a product availability status data signal. An RF tag is coupled to the sensor for receiving sensor signals and transmitting the sensor signals to a remote location for processing.

The sensor for sensing presence/absence of stocked product and generating a product availability signal may be one of several different types.

It may for instance be an inductance sensor that generates shelf product availability status data signals representing at least one of fully stocked, empty, and partially stocked product availability.

It may also be a weight sensor that generates shelf product availability status data signals.

Also, the sensor may be an optical sensor that generates shelf product availability status data signals.

Again, the sensor may be a light-beam sensing device for purposes of monitoring presence/absence of columns of products and generating shelf product availability status data signals.

The sensor may also be a conductive contact sensor detecting varying properties of product present on a shelf and generating shelf product availability status data signals.

The preferred sensor arrangement for sensing presence/absence of stocked product and generating shelf product availability status data signals is a radio based detector utilizing RF transmission lines. When a shelf is empty the transmission line will be properly terminated or matched and therefore reflections due to the source being mismatched to the line will be minimized. When items are present on the shelf the transmission line will have a change in impedance and become mismatched causing the RF signals to reflect back to the source. These reflections are monitored by a directional coupler and can be detected by a micro-processor and a determination as to the state of the shelf (empty or items present) can be made. When the RF signal containing a low- or no-stock condition is forwarded to a server, an alert is generated and forwarded to appropriate people, reordering, or restocking systems via e-mail, pager, RF text messaging, website indicators, voice-based interactive or mail systems, and the like.

Thus, the present invention relates to a low-stock alert sensing system comprising at least one display device for stocking a product; an antenna associated with each display device for sensing presence/absence of stocked product and generating a product availability status data signal; a sensor for noting the status of each antenna; and an RF tag coupled to the sensor for receiving the sensor signals and transmitting the sensor signals to a remote location for processing.

The invention also relates to a method of providing a low-stock alert sensing system comprising the steps of stocking product on at least one display device; associating at least one antenna with each display device; associating at least one sensor for sensing presence/absence of stocked products and generating a product availability status data signal; and coupling an RF tag to at least one sensor for receiving the sensor status data signal and transmitting the sensor signals to a remote location for processing.

BRIEF DESCRIPTION OF THE DRAWINGS

These and other more detailed objects of the present invention will be disclosed when taken in conjunction with the following Detailed Description of the Drawings in which like numerals represent like elements and in which.

DETAILED DESCRIPTION OF THE DRAWINGS

The system disclosed hereafter will be of value to retailers as well as manufacturers through its ability to inexpensively monitor and report presence/absence of displays that are placed into pre-specified locations.

Another retail issue is to be able to remotely monitor retail store shelf layouts and reset compliance. In particular, sales variance, in some cases, is believed to be due to stocking adjacencies or location. For example, placing ant-acids next to diarrhea medicine may create more sales than putting them next to stomach remedies.

Further, store plan-o-grams change periodically and it is desirable to know which stores have complied with a new layout at any given time.

Figure 1:
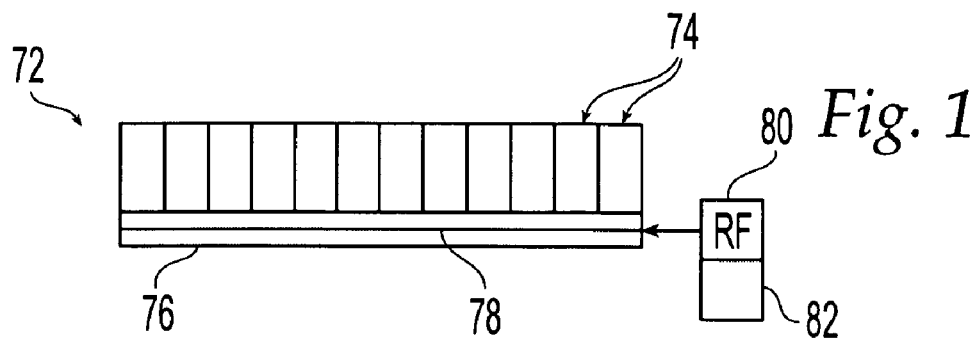
FIG. 1 is a schematic representation of a side view of one embodiment of the present invention in which magnetic field strength is measured to detect the presence/absence of stocked product.
Figure 2:
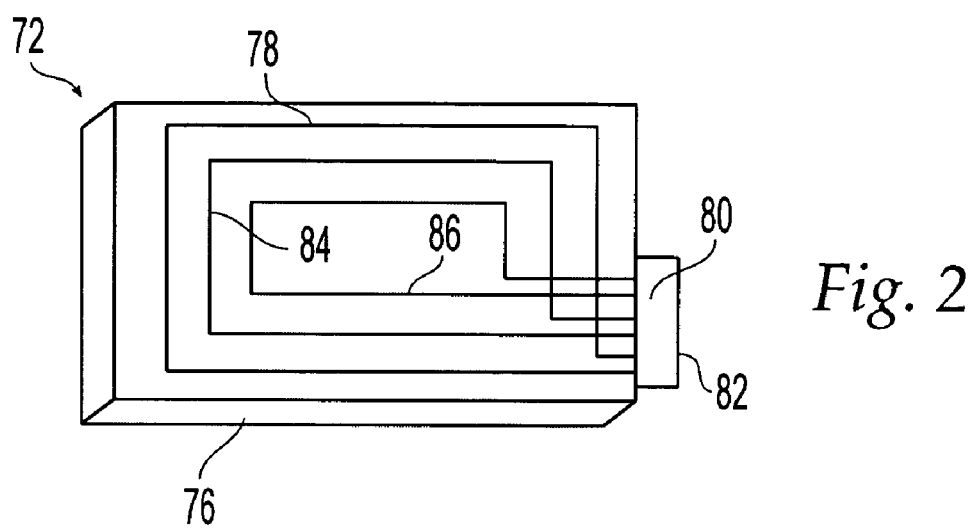
FIG. 2 is a plan view of the embodiment of FIG. 1, showing the use of a plurality of wire loops embedded in or attached to a display shelf to create the magnetic field strength that detects the presence/absence of stocked product.

Several technologies already exist for incorporation into the novel inventive "Out-of-Stock" monitoring. One such technology is shown in FIG. 1. The monitoring device 72 includes a plurality of product packages 74 placed on a shelf 76. The "shelf" 76, of course, can be any material containing product or items available to consumers, such as wooden shelves, corrugated cardboard sheets, sheet metal, and the like. One or more inexpensive wires 78 can be embedded in, laid on, or attached to the cardboard shelves to form one or more "loops" on each shelf as shown in FIG. 2. The wires 78 can also be embedded in plastic or other thin sheets that are adhered to or laid on the shelf 76. The one or more loops are coupled to a single tag 80 attached to the shelf (or shelves) 76. The loops of wire 78 can be spread along a shelf 76 to cover one or more sections of product display areas. The tag 80 contains display identification circuitry (well-known in the art) as a means 82 for deciphering small changes in the electromagnetic field associated with the wire 78. It may also be desirable to embed similar wire loops into thin plastic shelf liners that can be retrofitted to certain semi-permanent or permanent displays.

FIG. 2 is a plan view of the shelf 76 shown in FIG. 1 that illustrates the use of three wire loops 78, 84, and 86 embedded into a shelf or a shelf liner and connected to the tag 80 to determine presence/absence of stock on the shelf.

Figure 3:
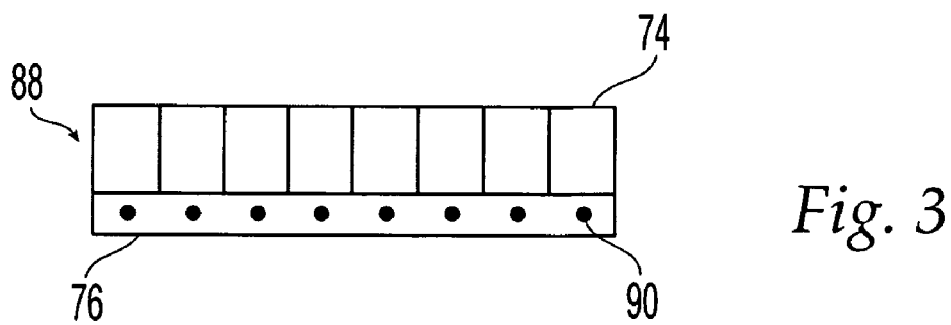
FIG. 3 is a side view of another embodiment of the present invention in which the presence/absence of stocked product is detected by weight sensors embedded or associated with a display shelf holding product.
Figure 4:
FIG. 4 is a schematic illustration of a micro-switch that could be embedded in or associated with the embodiment shown in FIG. 3, to perform the function of a weight sensor.

FIG. 3 illustrates another embodiment of the present invention that utilizes weight sensors to detect weight or changes in weight and report status through voltage changes as is well known in the art. The system 88 shown in FIG. 3 includes a plurality of the products or product containers 74 that are again placed on a shelf, or shelf liner, 76. At least one weight sensor 90 is placed on, within, or attached to the shelf or shelf liner 76. Inexpensive micro-switches such as 92 shown in FIG. 4 may be sandwiched between layers of cardboard, for example only, for opening a simple circuit when an empty shelf condition occurs (or when tension on the switch is less than a pre-specified amount).

Figure 5:
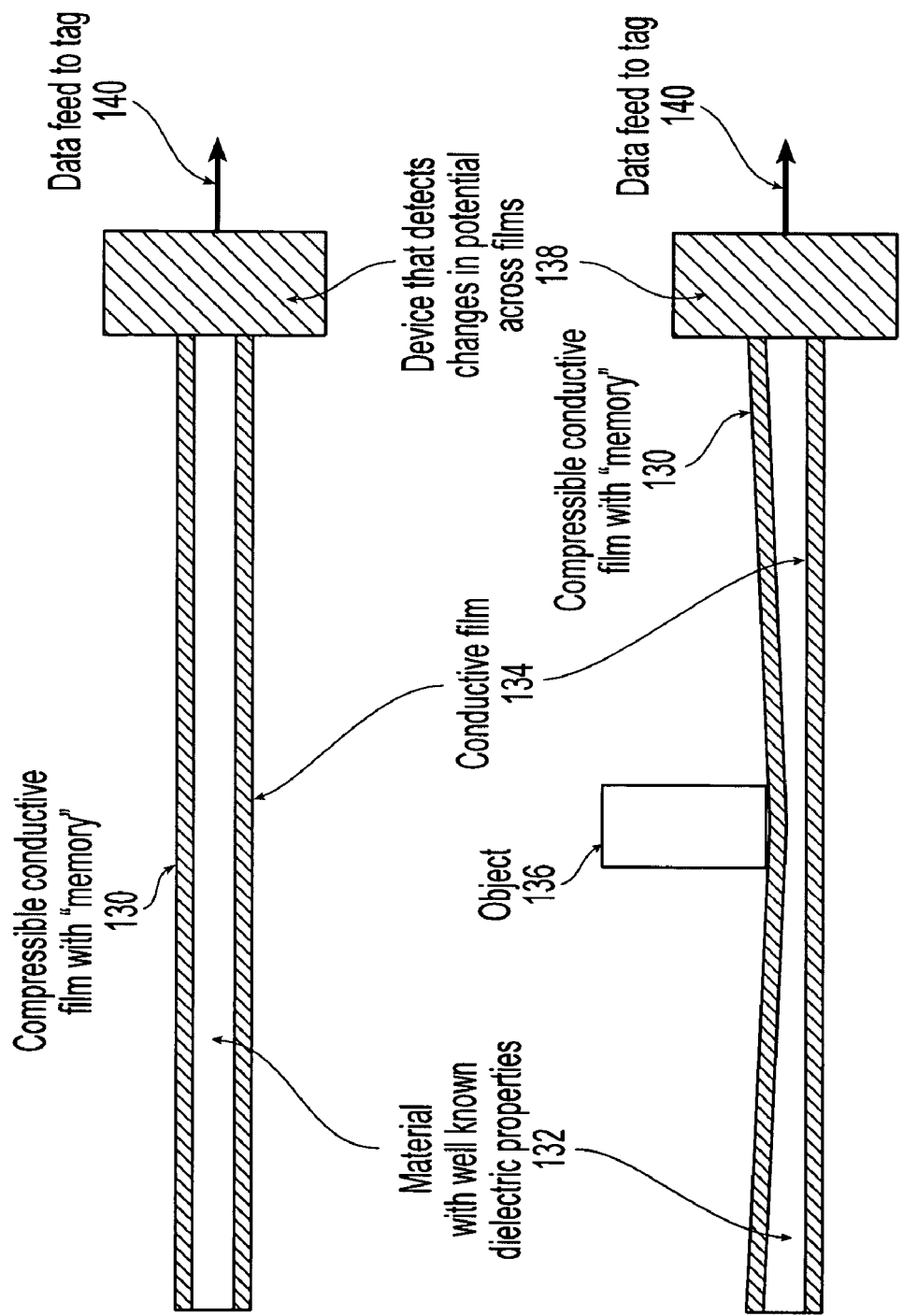
FIGS. 5a and 5b illustrate a weight-sensing film that measures changes in electric potential and can be laid on shelves to identify the presence of objects placed on it.

Another means of measuring weight, shown in FIGS. 5a and 5b, is a pair of thin conductive films 130 and 134, similar to plastic or Mylar, separated by a material 134 with well-known dielectric properties. The top film 130 is compressible, but has a memory that returns it to its original state as shown in FIG. 5a. This resistance to indentation from objects is well calibrated. The presence of an object 136 changes the resistance to electric potential across the films through an indentation as shown in FIG. 5b, and is measured through a device 138 that converts the changes to a data stream that is fed to the contact tag through a cable 140.

Figure 6:
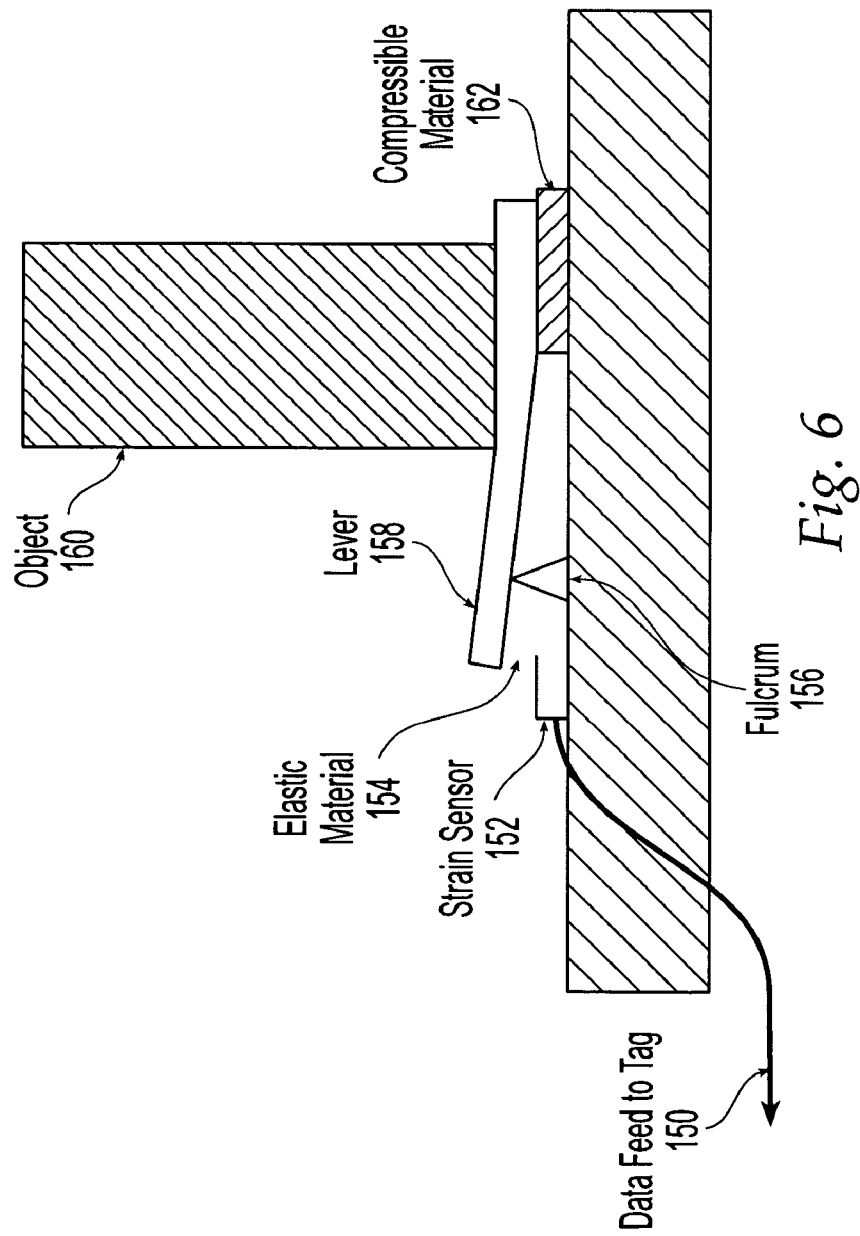
FIG. 6 is an illustration of a continuous-state device with wider dynamic range than the weight sensor of FIG. 4, which permits more refined readings concerning weight and weight changes based on a lever concept.

Alternately, more elaborate continuous-state devices with wider dynamic range can be inconspicuously embedded into reusable "bases" or platforms on which displays are placed. Such a system is shown in FIG. 6. This system permits more graduated readings about weight and weight changes. Lever 158 movement is limited by compressible material 162. A fulcrum 156 further lessens movement of an elastic material 154 that is strained by the presence of an object 160. A sensor 152 converts the slight movement to variable voltage, and then to data which is fed to the contact tag through a cable 150. As with the other embodiments described herein, status conditions are then converted through an inexpensive tag into RF signals that can be detected by readers in a given facility for downstream reporting to a remote server as disclosed, for example, in prior application S.N. US 2004/0056091, which in turn, can send a variety of alerts to interested personnel, websites, e-mail systems, voicemail, reorder information collection systems, and other means of notification.

Figure 7:
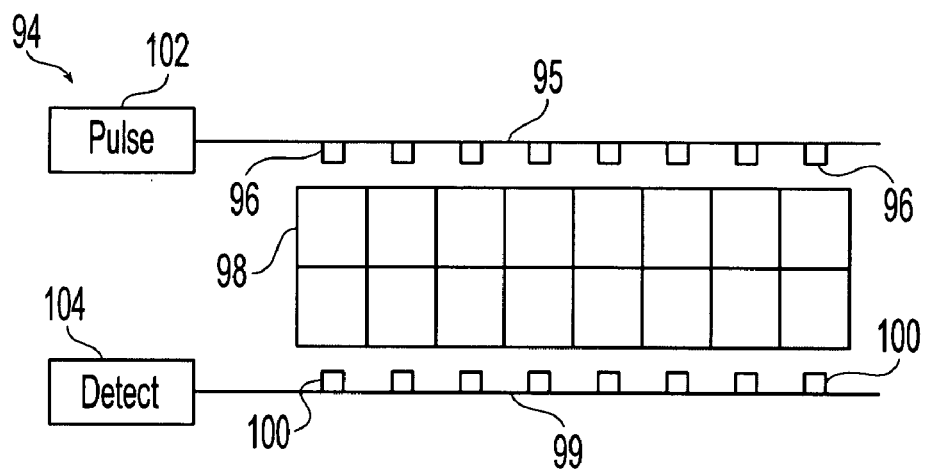
FIG. 7 illustrates still another embodiment of the present invention in which optical sensors are used to detect the presence/absence of stocked product.

FIG. 7 illustrates another embodiment of the present invention in which optical sensors are utilized to detect product presence/absence. Optical sensors are commonly used today in many manufacturing processes. These sensors suffice for the purposes of monitoring presence or absence of rows (or columns) of packaged product. As can be seen in FIG. 7, the system 94 comprises at least one but preferably a small re-usable strip 95 of lights 96, that are pulsed periodically (e.g. every three hours) in succession by pulser circuit 102. Opposite the lights, with the product 98 in rows (or columns) in between them, is a corresponding strip 99 of photoelectric cells 100. The presence of product 98 interrupts the light beam, or beams, causing one or more of the cells 100 to report a non-empty state. As multiple sensors within a display detect their corresponding lights, empty or non-empty states of rows (or columns) of products or near-empty states of a particular shelf would be detected by detector 104 (which could be a tag as described herein) and reported.

Figure 8:
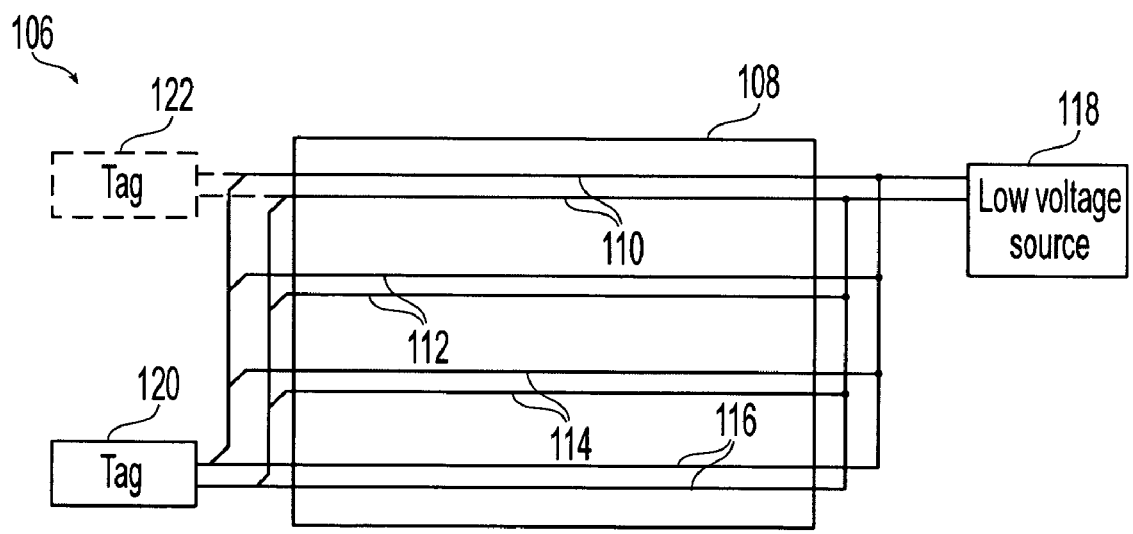
FIG. 8 illustrates yet another embodiment of the present invention in which conductive contact sensors are used to detect the presence/absence of stocked product.

FIG. 8 discloses still another embodiment of the present invention in which conductive contact sensors may be used to detect the presence/absence of product on a shelf. It is well-known that dielectric properties of product packaging varies with the product and the package. Thus, pairs of spaced wires 110, 112, 114, and 116 are placed on the surface 108 of display shelves to register changes in very low amperage/voltage (e.g. 5 volts or less) supplied by source 118. Such low amperage/voltage prevents any risk of shock, spark, or electrolysis of the product. When one or more packages of product rests on a slightly-separated (e.g. 1 inch apart) pair of wires, resistance across the pair is lowered and corresponding changes in voltage are noted by a small processor on the tag 120 coupled to each of the wire pairs 110, 112, 114, and 116. One tag may be used for all wire pairs or an individual tag 122 may be coupled to each wire pair separately. The changes in voltage noted by the tag 120 (or 122) are reported for evaluation.

Each of the approaches and methods named above has unique strengths and limitations. Periodic reads extend battery life and each device is sufficiently small to lessen conspicuity to store personnel or consumers. Further, any of these methods can be used in conjunction with a relatively inexpensive tag for reporting as described in the fore mentioned co-pending patent application. Such tags can be re-used or their cost would be inconsequential if they are discarded. In some cases, such as the optical and dynamic-range weight sensor, re-use of the sensor across displays would be desirable, necessitating some intervention by the person installing the display. In such a case, the connection between the reusable sensor and the tag on the display should be robust and simple, such as clipping a small cord into the equivalent of today's telephone jack.

A large percentage of the items that can be promptly replenished through store-door delivery, such as carbonated beverages or salty snacks, tend to have aluminum foil in their packaging to keep the product fresh and to lengthen shelf life of the product. Products in these categories are either packaged in aluminum cans or plastic bottles. It has long been known that metal tends to reflect radio waves and water tends to absorb them. A radio-based stock alert system that takes advantages of these absorption and reflection characteristics is highly desirable. These types of products or packages when placed in close proximity to a well matched transmission line cause a change in impedance in the line and a mismatch to occur. This mismatch causes the RF signals to reflect back to the source. These reflections are detected through a directional coupler and measured with a micro-controller.

Figure 9:
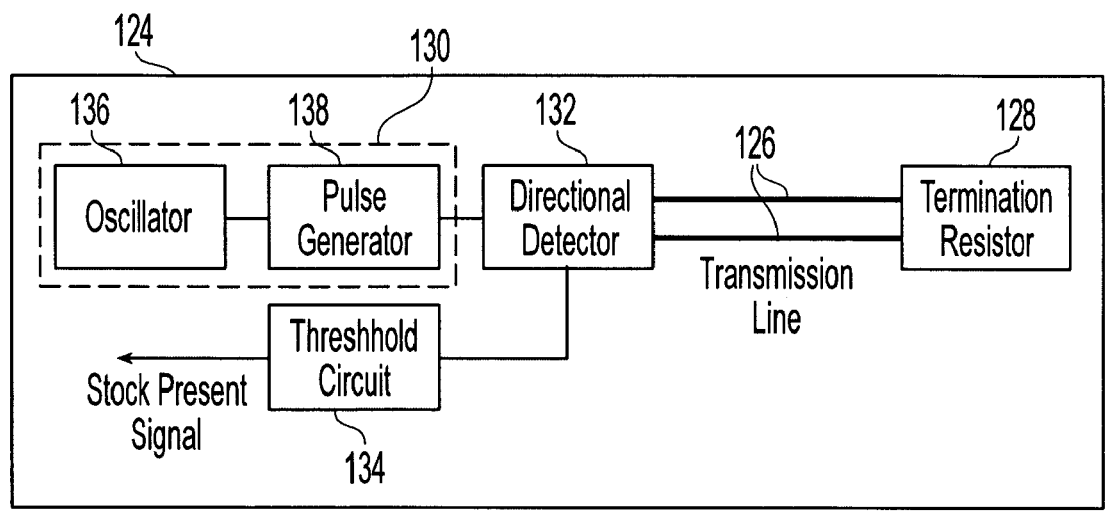
FIG. 9 illustrates in block diagrammatic form the preferred embodiment of the present invention in which a transmission line is fed an RF signal. The match on the transmission line is measured through a directional coupler and the shelf condition (empty or items present) can be determined. The line will be mismatched when items are present on the shelf.

Such a system is disclosed in FIG. 9 as the preferred embodiment of the present invention. The system 124 disclosed therein provides the new type of sensor, as set forth above, for detecting the presence of stock items placed on a shelf. The system 124 uses a transmission line 126 that has air on at least one side (such as a microstrip or parallel lines). This transmission line 126 is terminated at one end in a resistor 128 that is equal to the characteristic impedance of the transmission line. It is fed at the other end by an RF generator 130 and a directional detector 132. The stock is assumed to have radio wave properties, which, when placed in close proximity to a well matched transmission line, will cause a mismatch on the line. The signal generated by oscillator 136 and pulse generator 138 travels down the transmission line 126 and almost 100% of the signal is absorbed in the terminating resistor 128 at the end of the transmission line 126. With no product present, very little signal is reflected. The directional detector 132 measures reflected power and so its output is at a low value. If a conductive or radio-reflective item is placed on or near the transmission line, the capacitance associated with it will cause an impedance mismatch on the transmission line. This will result in some of the RF signal being reflected back toward the RF generator 130. This causes the output level of the direction detector 132 to rise. The threshold circuit 134 can be set to send a signal to a monitoring computer that there is at least some stock on the shelf. This circuit has been tested and functions quite reliably providing that the RF is swept over a fairly wide range. The reason for this is that the mismatch may vary with frequency (i.e. at any one frequency there may be a local good match). By performing the reflected power measurement over a wide frequency range, this effect is minimized. The oscillator 136 runs at a high frequency (e.g. several MHz, such as the clock oscillator for a microprocessor) and feeds pulse generator 138 that outputs very narrow pulses, such as a nanosecond in duration. These pulses have energy distributed over the RF spectrum up to around 1 GHz, and exhibit multiple peaks at harmonics of the oscillator frequency. The directional detector 132 is designed to function over a very broad band, such as 100 MHz to 1 GHz.

With no stock present, the output of the directional detector 132 is small; with stock present, the output of the detector 132 is higher. This allows a simple binary empty/not empty decision to be made by threshold circuit 134 about each shelf or region of a shelf on which the transmission lines are placed.

The heart of the system 124 is the transmission line 122 that picks up reflected signals. This must be designed so that some of the field associated with the transmission of RF energy protrudes into the space where the objects to be sensed are placed. Several different types of transmission lines are possible, but one of the most attractive is the microstrip. A microstrip line is easy and inexpensive to produce, inconspicuous, and has a ground plane on one side that acts as a shield from a similar monitoring loop located in an adjacent plane. Cardboard shelves commonly found on temporary merchandising displays make an excellent dielectric. The microstrip line can be fabricated by having one side of the shelf aluminized and the transmission line can be printed on the other side using conductive ink. For more permanent shelves, plastic can be used in lieu of cardboard, and wire or conductive tape may be used in lieu of conductive ink, making the detection unit more durable without adding significantly more expense. Multiple antennae may be connected to a single detector using an RF switch to allow a partial-stock condition to be reported.

Any item that disturbs the field produced by the transmission line can be sensed. Tests show that anything with a few square inches of conductive/reflective material (e.g. aluminized Mylar) can be readily detected. Aluminum beverage cans and non-metallic plastic bottles containing liquids can also be detected.

The advantages of using the transmission line approach include an easily fabricated microstrip using the shelf (cardboard or plastic) as the dielectric medium for the transmission line; covering the transmission line with a non-reflecting material such as paper thus making the transmission line inconspicuous; no mechanical parts to jam, wear out, or break; using inexpensive key components that are easy to produce and to deploy; and the use of the system in conjunction with an Active Transmitter Tag to report stock conditions regardless of where in the store it is deployed. In tests, the system has been able to detect objects as small as a U.S. quarter. Beverage cans and any aluminized plastic (e.g., Hershey bar wrapper) are easy to detect.

Thus, there has been disclosed a novel low stock alert system in which the presence/absence of stocked items is detected and the result transmitted to a remote server for analysis and comparison.

One system disclosed utilizes electromagnetic fields generated by conductive loops and affected by the placement of product to be monitored to be detected and analyzed to determine product presence/absence.

Still another system disclosed utilizes a weight sensing device for detecting the presence/absence of product.

Yet another embodiment has been disclosed that utilizes optics to determine the presence/absence of products stocked on shelves.

Also, another embodiment of the invention has been disclosed in which conductive contact sensors (wire pair) are used to detect the presence/absence of product by sensing a change in the resistance between wire pairs as product is removed or added.

A preferred embodiment has also been disclosed in which a new type of sensor, an RF transmission line, is used to sense the presence/absence of stocked product.

While particular embodiments of the invention have been shown and described in detail, it will be obvious to those skilled in the art that changes and modification of the present invention, in its various embodiments, may be made without departing from the spirit and scope of the invention. Other elements, steps, methods, and techniques that are insubstantially different from those described herein are also within the scope of the invention. Thus the scope of the invention should not be limited by the particular embodiments described herein but should be defined by the appended claims and equivalents thereof.

We claim:

1. A low stock-alert sensing system comprising:
at least one display device for stocking a product, the at least one display device comprising at least one shelf for stocking products;
a sensor associated with each display device for sensing presence/absence of stocked product and generating a product availability status data signal; and
an RF tag coupled to the sensor for receiving the sensor signals and relaying the sensor signals to a remote location for processing, the RF tag being an RFID tag that stores an identification data signal representing the at least one display device;
wherein the RF tag relays the received product availability status data signal with the display identification data signal to a remote location for processing;
wherein the sensor for sensing presence/absence of stocked product and generating a product availability status data signal comprises:
an inductance sensor that generates shelf product availability status data signals representing at least one of fully stocked, empty, and partially stocked product availability;
wherein the inductance sensor comprises:
an electrically conducting wire associated with each display shelf to form at least one loop on each shelf for generating a magnetic field whose signal strength varies with amount of stocked product on the associated display shelf and represents the stock presence/absence data signal;
the RFID tag is coupled to the at least one of the electrically conductive wires on at least one of the display shelves for receiving the magnetic field strength signal; and
a circuit forming part of said tag for deciphering the magnetic field strength signal to determine product availability on the at least one of the display shelves.

2. A low stock-alert sensing system comprising:
at least one display device for stocking a product, the at least one display device comprising at least one shelf for stocking products;
a sensor associated with each display device for sensing presence/absence of stocked product and generating a product availability status data signal, the sensor comprising an optical sensor that generates product availability status data signals representing at least one of fully stocked, empty, and partially stocked product availability, wherein the optical sensor comprises a light-beam sensing device for purposes of monitoring presence/absence of product availability; and
an RF tag coupled to the sensor for receiving the sensor signals and relaying the sensor signals to a remote location for processing, the RF tag being an RFID tag that stores an identification data signal representing the at least one display device;
wherein the RF tag relays the received product availability status data signal with the display identification data signal to a remote location for processing;
wherein the light-beam sensing device comprises:
a number of lights on one side of columns of product for generating a light beam, one light beam for each column of product;

a corresponding number of photoelectric cell light sensors on an opposite side of each column of product; and a pulsing circuit coupled to each of the lights to pulse the lights periodically in succession whereby the presence of product interrupts the light beam causing one or more of the light sensors to signal one of an empty/non-empty product availability state for each column of product.

3. A low stock-alert sensing system comprising:

at least one display device for stocking a product, the at least one display device comprising at least one shelf for stocking products;

a sensor associated with each display device for sensing presence/absence of stocked product and generating a product availability status data signal, the sensor comprising a conductive contact sensor detecting varying dielectric properties of product present on each shelf; and an RF tag coupled to the sensor for receiving the sensor signals and relaying the sensor signals to a remote location for processing, the RF tag being an RFID tag that stores an identification data signal representing the at least one display device;

wherein the RF tag relays the received product availability status data signal with the display identification data signal to a remote location for processing;

wherein the conductive contact sensor comprises:

at least one pair of wires on each shelf, each pair of wires separated by a distance sufficient to allow product to rest on both wires in a given pair such that one or more stocked product resting on a pair of wires causes the electrical resistance across the wire pair to be varied;

a low voltage source, sufficiently low to protect the product, coupled to each pair of wires; and a tag, including a microprocessor on the tag, for monitoring changes in voltage on the wires because of the presence/absence of stocked product.

4. The system of claim 3, further comprising a separate monitoring of each wire pair to detect the presence/absence of stocked product within and/or across each shelf.

5. A low stock-alert sensing system comprising:

at least one display device for stocking a product, the at least one display device comprising at least one shelf for stocking products;

a sensor associated with each display device for sensing presence/absence of stocked product and generating a product availability status data signal; and an RF tag coupled to the sensor for receiving the sensor signals and relaying the sensor signals to a remote location for processing, the RF tag being an RFID tag that stores an identification data signal representing the at least one display device;

wherein the RF tag relays the received product availability status data signal with the display identification data signal to a remote location for processing;

wherein the sensor for sensing presence/absence of stocked product and generating a product availability status data signal comprises:

a radio based stocked product availability detector utilizing RF signals that are output to a well matched transmission line and becomes mismatched when items are present on a shelf; and a signal detector for determining the amount of RF signal reflection caused by the change in impedance of a transmission line and the line to become mismatched and reflect signals thereby detecting the presence/absence of stocked product.

6. The system of claim 5, wherein the radio based stocked product availability detector further comprises:

an RF signal transmission line having first and second ends and air space on at least one side;

a resistor terminating the first end of the transmission line in its characteristic impedance to absorb the transmitted RF energy;

a directional signal detector being coupled to the second end of the transmission line for detecting signal reflections caused by a mismatch of the line due to the presence of product;

an RF signal generator providing RF signal pulses to the directional signal detector for application to the RF signal transmission line; and a threshold detector coupled to the directional signal detector for measuring the signals reflected by the stocked product to determine presence/absence of the stocked product.

7. The system of claim 6, wherein the transmission line comprises a microstrip line.

8. The system of claim 6, wherein the transmission line comprises elongated parallel lines.

9. A low stock-alert sensing system comprising:

at least one display device for stocking a product, the at least one display device comprising at least one shelf for stocking products;

a sensor associated with each display device for sensing presence/absence of stocked product and generating a product availability status data signal, the sensor comprising a weight sensor that generates shelf product availability status data signals representing at least one of fully stocked, empty, and partially stocked product availability; and an RF tag coupled to the sensor for receiving the sensor signals and relaying the sensor signals to a remote location for processing, the RF tag being an RFID tag that stores an identification data signal representing the at least one display device;

wherein the RF tag relays the received product availability status data signal with the display identification data signal to a remote location for processing;

wherein the weight sensor comprises:

at least two layers of flexible conductive material on which the stocked product is to be placed; and a dielectric material disposed between the at least two layers of flexible material, whereby the weight sensor produces relatively low resistance readings across the layers of flexible conductive material when a stocked product is placed on said flexible material and produces relatively higher resistance readings across the layers of flexible conductive material when a stocked product is low or no longer on the shelf.

10. A low stock-alert sensing system, comprising:

a display device for stocking products;

an inductance sensor associated with the display device and that generates a sensor signal;

the inductance sensor including an electrically conducting wire that forms a loop, the loop generating a magnetic field that varies with an amount of stocked products on the display device, wherein the sensor signal is generated based on the magnetic field; and an RF tag coupled to the inductance sensor and relaying the sensor signal to a remote location for processing.

11. A low stock-alert sensing system, comprising:
a display device for stocking products;
a light-beam sensing device associated with the display device and configured to generate a sensor signal; and
an RF tag coupled to the light-beam sensing device and relaying the sensor signal to a remote location for processing;
the light-beam sensing device including:
  a light attached at a first location on the display device for generating a light beam;
  a photoelectric cell attached at a second location on the display device and being positioned to detect the light beam; and
  a pulsing circuit coupled to the light and configured to pulse the light periodically,
wherein the presence of product on the display device interrupts the light beam causing the light-beam sensing device to generate the sensor signal with an indication of the presence of the product on the display device.

12. A low stock-alert sensing system comprising:
a display device for stocking products;
a conductive contact sensor configured to detect properties of products present on the display device and to generate a product availability status data signal;
an RF tag coupled to the conductive contact sensor and configured to relay the product availability status data signal to a remote location for processing;
the conductive contact sensor comprising:
  a pair of wires disposed on the display device and separated by a distance sufficient to allow a product to rest on both wires causing the electrical resistance across the pair of wires to be varied;
  a low voltage source coupled to the pair of wires;
  a processing device configured to monitor changes in voltage on the pair of wires due to the presence or absence of stocked products.

13. A low stock-alert sensing system, comprising:
a display device for stocking products;
a sensor configured to sense the presence or absence of stocked product on the display device and to generate a product availability status data signal; and
an RF tag coupled to the sensor and configured to relay the product availability status data signal to a remote location for processing;
the sensor comprising:
  a radio based stocked product availability detector utilizing RF signals that are output to a matched transmission line and that become mismatched when an item is present on the display device; and
  a signal detector configured to detect an amount of RF signal reflection caused by a change in impedance of the matched transmission line, wherein the presence or absence of stocked products on the display device is determined based on the amount of RF signal reflection.

14. A low stock-alert sensing system, comprising:
a display device for stocking products;
a weight sensor disposed on the display device and configured to generate a shelf product availability status data signal that indicates the presence or absence of stocked product on the display device; and
an RF tag coupled to the weight sensor and configured to relay the shelf product availability status data signal to a remote location for processing;
the weight sensor comprising:
  two layers of flexible conductive material on which the stocked products are to be placed; and
  a dielectric material disposed between the two layers of flexible material, wherein the weight sensor produces a first range of resistance readings across the layers of flexible conductive material when a product is placed on the flexible conductive material and produces a second range of resistance readings across the layers of flexible conductive material when the product is not on the flexible conductive material.

* * * * *